March 30, 1965     J. FAISANDIER     3,175,585

HYDRO-ELECTRIC SERVO CONTROL MECHANISMS

Filed March 15, 1961     2 Sheets-Sheet 1

United States Patent Office 3,175,585
Patented Mar. 30, 1965

3,175,585
HYDRO-ELECTRIC SERVO CONTROL
MECHANISMS
Jacques Faisandier, 32 Blvd. Felix-Faure,
Chatillon-sous-Bagneux, France
Filed Mar. 15, 1961, Ser. No. 96,031
Claims priority, application France, Mar. 24, 1960,
822,254
20 Claims. (Cl. 137—625.65)

The present invention relates to a hydro-electric servo control mechanism whose valve distributor is controlled by a torque motor and comprising a measuring organ for obtaining a feedback voltage and characterised by the use of three measuring organs of which one provides a feedback voltage proportional to the output movement of the hydraulic device, the second provides a feedback voltage proportional to the speed of the torque motor and the third provides a feedback voltage proportional to the angular deviation of the torque motor.

The applicant has now brought improvements to this mechanism having as an object to permit the motor to be coupled to a hydraulic distributor with a rotary valve.

As the operation of the rotary valve requires an angle of rotation of ±10°, it is necessary—in order to put this new improvement into practical use—to provide a torque motor capable of an angle of rotation of ±10°, conventional torque motors generally being capable of an angle of ±3°, and rarely of ±6°, if they have the conventional construction of a bar oscillating between two armatures; these conventional torque motors can have an angle of rotation of ±36° if they have a rotor of circular section rotating in a stator of corresponding shape.

According to the invention, there is used; either a magnet of the bar type but with the bar and armature having their corners cut away, which permits an increase in the angle of rotation up to the required value without having a large effect on the maximum frequency, on account of the increase in the effective surface area resulting from cutting away the corners, or a circular rotor, but in this case the number of the poles is increased which has a result to reduce the angle of rotation to the required value ±10, the maximum frequency being at the same time increased exponentially, owing to the fact that the increase in the effective surface area superimposes its effect on that of the reduction in the angle of rotation, which has the advantage of permitting higher frequencies to be passed.

A further object of the invention is to permit compact mounting of the mechanism in such a way that it can be accommodated in a submersible housing.

Figure 1:
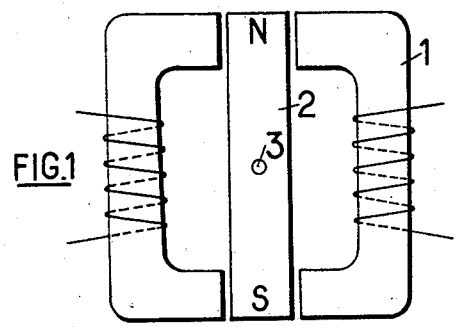
Figure 2:
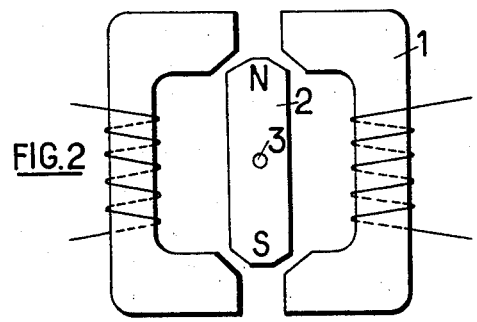
Figure 3:
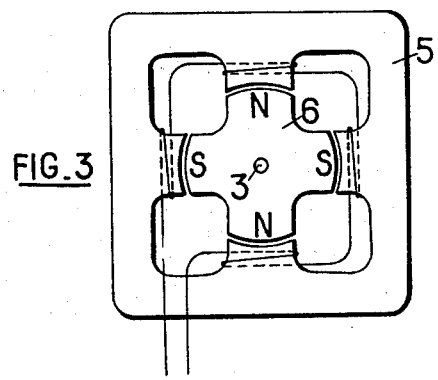
Figure 4:
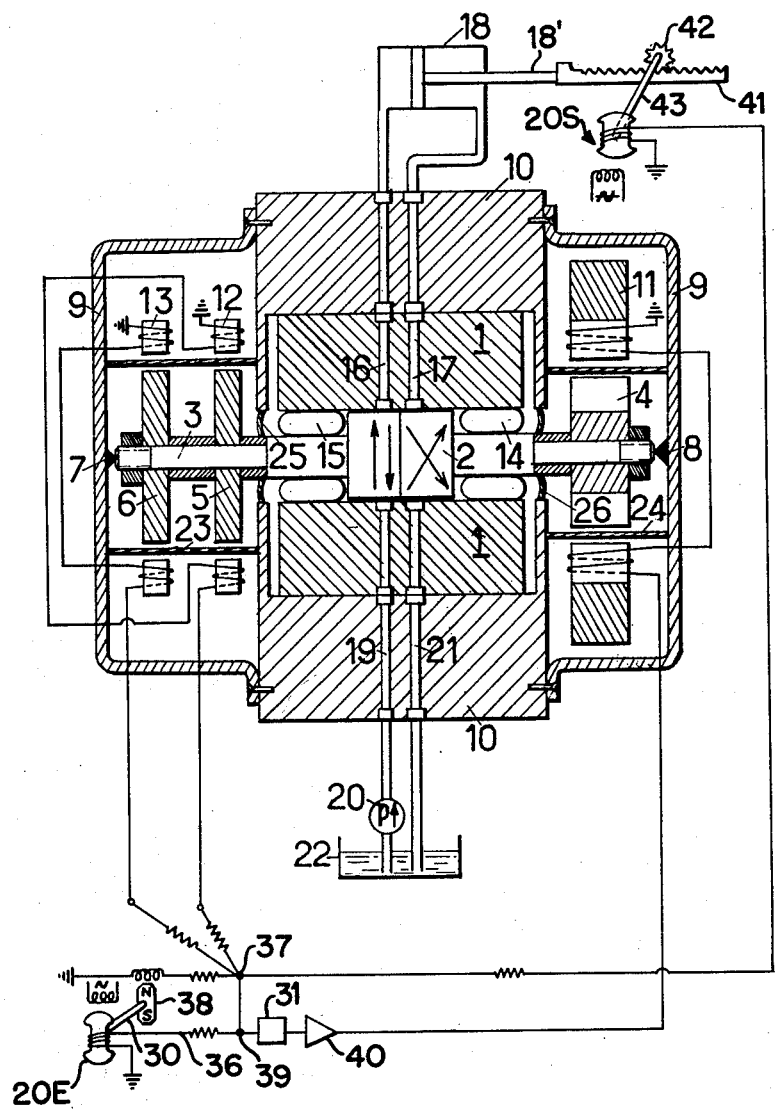

The invention is further described hereinafter, with reference to the accompanying drawings wherein:

FIGURE 1 shows diagrammatically a conventional torque motor with permanent magnet in the form of a bar, FIGURE 2 shows a motor of the same type but with the corners of the stationary and movable armature cut away, FIGURE 3 shows diagrammatically a quadruple pole motor of the type having a circular rotor, and FIGURE 4 shows diagrammatically and in axial section an assembly comprising a torque motor, a damping generator, an induction potentiometer and a valve distributor, these four organs being mounted on a common shaft together with an electrical schematic therefor.

In FIGURES 1 and 2, 1 indicates the fixed armature, 2 the bar constituting a permanent magnet which pivots about pivot 3. It is apparent from FIGURE 2 that it is always possible to determine such a chamfer that excitation of the winding will produce the required deviation $\theta$. For example, in the neutral position shown, the chamfers of bar 2 include an angle $\theta$ with the corresponding chamfers of armature 1; when the windings are excited, the chamfers of 1 and 2 assume parallel relationship, causing the desired deviation $\theta$.

In FIGURE 3, 5 indicates the fixed armature comprising four poles indicated by the letters N and S, and 6 designates the movable armature constituted by a cross-shaped piece corresponding to the four poles.

In FIGURES 1 to 3 the windings of the fixed armature have been shown diagrammatically, the movable armature may be constituted by a permanent magnet or by a non-permanent magnet magnetised by a winding.

In FIGURE 4, 1 indicates the hollow cylindrical body of the hydraulic distributor, and 2 the cylindrical rotary valve represented by a conventional symbol and mounted on the shaft 3 which carries on one side the rotor 4 of the torque motor and on the other side rotor 5 of the tachymetric organ (damping generator) and rotor 6 of the induction potentiometer.

Shaft 3 is mounted in fixed supports 7 and 8 in the cylindrical housing 9 which is fixed on the cylindrical cover 10 in which the body 1 of the hydraulic distributor is accommodated.

11, 12, 13 indicate the stator windings respectively associated with the rotors 4, 5 and 6. The rotary valve 2 of the hydraulic distributor is mounted in body 1 by way of needle bearings 14, 15 preferably of the shape indicated in the applicant's pending application Serial No. 358,631, now abandoned and my copending continuation in part application Serial No. 93,672, filed March 6, 1961.

In FIGURE 4 the rotor is given the usual symbol for four-way distributor valves, and in the body 1 and the cover 10 are shown the two pipes 16, 17 which alternately feed fluid to the jack 18 on the two opposite faces of the piston thereof, also pipe 19 for fluid fed by pressure by pump 20 and pipe 21 returning fluid to tank 22. A tight-sealed condition is ensured by mounting housing 9 on cover 10 with normal methods ensuring a tight seal.

Under some circumstances, and in particular when the assembly is submerged in oil, it will be adequate to ensure a tight-sealed condition by means of the membranes 23, 24 and/or seals 25, 26.

The assembly thus formed can take its place, for example, in the diagram of FIGURE 4 of my co-pending application Serial No. 797,654, now Patent No. 3,016,883, of which this application is a continuation-in-part, instead of elements indicated therein by reference characters 4, 5, 9, 12 and 20A.

The conversion of FIG. 4 of Patent No 3,016,883 is shown schematically in FIG. 4 of the present application. As shown, an input signal at 36 is provided mechanically by a rotary movement imparted to the shaft 30 on which is mounted the rotor of a deviation indicator 20E which supplies the input circuit 36 with an alternating current voltage which is proportional to the deviation angle imparted. A mixer 31 receives the alternating input voltage from 20E and the direct current feedback voltage supplied by damping circuit including the damping generator comprising rotor 5 and winding 12 and the alternating feedback voltage supplied by the induction potentiometer comprising rotor 6 and winding 13. Movement of the torque motor, controlling valve 2 and comprising rotor 4 and winding 11, causes the damping generator and the induction potentiometer to provide said feedback voltages to the mixer 31, the output of which is applied to the amplifier 40 controlling said torque motor. Finally, there can be introduced at the input 37, an additional voltage proportional to the speed of the input movement. This voltage is generated by a generator 38 comprising a rotor connected to the shaft 30 and a fixed stator winding, the output of which is applied to the input 37.

The conventional feedback arrangement denoting the output of fluid motor 18 comprises a rack 41 solid with the rod 18' of motor 18, which through the pinion 42 and the shaft 43 causes rotation of the rotor of a deviation indicator 20S through an angle proportional to the extent of said output movement. The output of 20S is connected to point 37.

What we claim is:

1. In a hydro-electric servo control mechanism of the type in which the final position of a hydraulic device is defined by an input voltage, the output movement of the hydraulic device deriving an output voltage providing a feedback voltage, the combination comprising a valve distributor for effecting movement of the hydraulic device and including a rotary valve member, a torque motor having a rotor and normally responsive to combined input and feedback voltages for moving the valve distributor, a magneto-electric generator having a rotor, a shaft, said rotary valve member and said rotors being mounted on said shaft and means to combine the input voltage, the feedback voltage, and the output voltage of said generator, said torque motor being electrically connected to be controlled by the combined input and feedback voltages and the output voltage of said generator.

2. The combination as set forth in claim 1 including stators co-operating with the respective rotors of said torque motor and said magneto-electric generator, and in which said shaft, said rotors and said stators are arranged in a tight-sealed housing.

3. The combination as set forth in claim 1 including stators co-operating with the respective rotors of said torque motor and said magneto generator respectively, in which said rotors are isolated by membranes in tight-sealed manner with respect to the associated stators.

4. In a hydro-electric servo control mechanism of the type in which the final position of a hydraulic device is defined by an input voltage, the output movement of the hydraulic device deriving an output voltage providing a feedback voltage, the combination comprising a valve distributor for effecting movement of the hydraulic device and including a rotary valve member, a torque motor having a rotor and normally responsive to the combined input and feedback voltages for effecting movement of the valve distributor, an angular deviation indicator having a rotor, a shaft, said rotary valve member and said rotors being mounted on said shaft and means to combine said combined input and feedback voltages with the output voltage of said indicator, said torque motor being electrically connected to be controlled by the combined input and feedback voltages and the output voltage of said indicator.

5. The combination as set forth in claim 4 including stators cooperating with the respective rotors of said torque motor and angular deviation indicator respectively, in which said rotors are isolated by membranes in tight-sealed manner from the associated stators.

6. The combination as set forth in claim 4 including stators co-operating with the respective rotors of said torque motor and said angular deviation indicator, and in which said shaft, said rotors and said stators are arranged in a tight-sealed housing.

7. A hydro-electric servo control mechanism of the type in which the final position of a hydraulic device is defined by an input voltage, the output movement of the hydraulic device deriving an output voltage providing a feedback voltage, the combination comprising a valve distributor for effecting movement of the hydraulic device and including a rotary valve member, a torque motor normally responsive to an input voltage for effecting movement of the valve distributor, an angular deviation indicator having a rotor, a magneto-electric generator having a rotor, a shaft, said rotary valve member and said rotors being mounted on said shaft and means to combine the input voltage, the feedback voltage and the output voltages of said indicator and said generator, said torque motor being electrically connected to be controlled by said combined voltages said input voltage and the feedback voltage.

8. The combination as set forth in claim 7 including stators cooperating with the respective rotors of said torque motor, said angular deviation indicator and said magneto-electric generator, in which said rotors are isolated by membranes in tight-sealed manner from the associated stators.

9. The combination as set forth in claim 7 including stators co-operating with the respective rotors of said torque motor said angular deviation indicator and said magneto-electric generator, and in which said shaft, said rotors and said stators are arranged in a tight-sealed housing.

10. A hydro-electric servo control mechanism of the type in which the final position of a hydraulic device is defined by an input voltage, the output movement of the hydraulic device deriving an output voltage providing a feedback voltage, the combination comprising a valve distributor for effecting movement of the hydraulic device and including a rotary valve member, a magneto-electric generator and an angular deviation indicator, each having a rotor and producing an output voltage upon rotation of its respective rotor, a torque motor having a rotor and normally responsive to combined input and feedback voltage for effecting movement of the valve distributor, a shaft, said three rotors and said rotary valve member being mounted on said shaft and means to combine said combined input and feedback voltage with the output voltages of said generator and said indicator, said torque motor being electrically connected to be controlled by the combined input and feedback voltages and output voltages of said generator and indicator.

11. The combination as set forth in claim 10 including stators cooperating with the respective rotors of said valve distributor, said angular deviation indicator and said magneto angular deviation generator, in which said rotors are isolated by membranes in tight-sealed manner from the associated stators.

12. The combination as set forth in claim 10, including stators co-operating with the respective rotors of said torque motor, said angular deviation indicator and said magneto-electric generator, and in which said shaft, said rotors and said stators are arranged in a tight-sealed housing.

13. In a hydro-electric servo control mechanism of the type in which the final position of a hydraulic device is defined by an input voltage, the output movement of the hydraulic device deriving an output voltage providing a feedback voltage, the combination comprising a valve distributor, a magneto-electric generator having a device, a torque motor for controlling the valve distributor and including a stator having spaced confronting field pole pieces with chamfered portions and a rotor having poles with their ends located between the chamfered portions, said motor being normally responsive to combined input and feedback voltages for effecting movement of the valve distributor, a magneto-electric generator having a rotor, the said rotors being connected together for rotation, means to combine the input voltage, the feedback voltage, and the output voltage of said generator, said torque motor being electrically connected to be controlled by the combined input and feedback voltages and the output voltage of said generator.

14. In a hydro-electric servo control mechanism of the type in which the final position of a hydraulic device is defined by an input voltage, the output movement of the hydraulic device deriving an output voltage providing a feedback voltage, the combination comprising a valve distributor for effecting movement of the hydraulic device, a torque motor for controlling the valve distributor and including a stator having spaced confronting field pole pieces with chamfered portions and a rotor having poles with their ends located between the chamfered portions, said motor being normally responsive to the combined input and feedback voltages for effecting movement of the valve distributor, an angular deviation indicator having a rotor, the said rotors being connected together for rotation, and means to combine said combined input and feedback voltages with the output voltage of said indicator, said torque motor being electrically connected to be controlled by the combined input and feedback voltages and the output voltage of said indicator.

15. In a hydro-electric servo control mechanism of the type in which the final position of a hydraulic device is defined by an input voltage, the output movement of the hydraulic device deriving an output voltage providing a feedback voltage, the combination including a valve distributor for effecting movement of the hydraulic device, a torque motor for controlling the valve distributor and including a stator having spaced confronting field pole pieces with chamfered portions and a rotor having poles with their ends located between the chamfered portions, said motor being normally responsive to an input voltage for effecting movement of the valve distributor, an angular devitation indicator having a rotor and providing an output voltage upon rotation of its rotor, a magneto-electric generator having a rotor, both said rotors being connected together for rotation, and means to combine the output voltages of said indicator and said generator, said torque motor being electrically connected to be controlled by said combined voltages, the input voltage and the feedback voltage.

16. In a hydro-electric servo control mechanism of the type in which the final position of a hydraulic device is defined by an input voltage, the output movement of the hydraulic device deriving an output voltage providing a feedback voltage, the combination comprising a valve distributor for effecting movement of the hydraulic device, a magneto-electric generator and an angular deviation indicator, each having a rotor and producing an output voltage upon rotation of its respective rotor, a torque motor for controlling the valve distributor and including a stator having spaced confronting field pole pieces with chamfered portions and a rotor having poles with their ends located between the chamfered portions, said motor being normally responsive to combine input and feedback voltage for effective movement of the valve distributor, said three rotors being connected together for rotation, and means to combine said combined input and feedback voltages with the output voltages of said generator and said indicator, said torque motor being electrically connected to be controlled by the combined input and feedback voltages and output voltages of said generator and indicator.

17. In a hydro-electric servo control mechanism of the type in which the final position of a hydraulic device is defined by an input voltage, the output movement of the hydraulic device deriving an output voltage providing a feedback voltage, a movable valve distributor for effecting movement of the hydraulic device, the combination comprising a multipolar torque motor having a rotor and normally responsive to combined input and feedback voltages for effecting movement of the valve distributor, a magneto-electric generator having a rotor, the said rotors being corrected together for rotation, means to combine the input voltage, the feedback voltage, and the output voltage of said generator, said torque motor being electrically connected to be controlled by the combined input and feedback voltages and the output voltage of said generator.

18. In a hydro-electric servo control mechanism of the type in which the final position of a hydraulic device is defined by an input voltage providing a feedback voltage and a movable valve distributor for effecting movement of the hydraulic device, the combination comprising a multipolar torque motor having a rotor and normally responsive to the combined input and feedback voltages for effecting movement of the valve distributor, an angular deviation indicator having a rotor, the said rotors connected together for rotation, and means to combine said combined input and feedback voltages with the output voltage of said indicator, said torque motor being electrically connected to be controlled by the combined input and feedback voltages and the output voltage of said indicator.

19. In a hydro-electric servo control mechanism of the type in which the final position of a hydraulic device is defined by an input voltage, the output movement of the hydraulic device deriving an output voltage providing a feedback voltage and a movable valve distributor for effecting movement of the hydraulic device, the combination comprising a multipolar torque motor normally responsive to an input voltage for effecting movement of the valve distributor, an angular deviation indicator having a rotor and a magneto-electric generator having a rotor, both said rotors being connected together for rotation, and means to combine the output voltages of said indicator and said generator, said torque motor being electrically connected to be controlled by said combined voltages, the input voltage and the feedback voltage.

20. In a hydro-electric servo control mechanism of the type in which the final position of a hydraulic device is defined by an input voltage, the output movement of the hydraulic device deriving an output voltage providing a feedback voltage, movable valve distributor for effecting movement of the hydraulic device, the combination comprising a magneto-electric generator and an angular deviation indicator each having a rotor and producing an output voltage upon rotation of its respective rotor, a multipolar torque motor having a rotor and normally responsive to combined input and feedback voltage for effecting movement of the valve distributor, said three rotors being connected together for rotation, and means to combine said combined input and feedback voltages with the output voltages of said generator and said indicator, said torque motor being electrically connected to be controlled by the combined input and feedback voltages and output voltages of said generator and indicator.

References Cited by the Examiner
UNITED STATES PATENTS 3,016,883   1/62   Fainsandier _____ 91—363

M. CARY NELSON, *Primary Examiner.*

K. J. ALBRECHT, M. KAUFMAN, *Examiners.*